United States Patent Office 3,226,561
Patented Dec. 28, 1965

3,226,561
SYNCHRONIZING DEVICES BETWEEN
ALTERNATING CURRENT SYSTEMS
Seiichi Taniai, Tsurumi-cho, Tsurumi-ku, Yokohama-shi, Japan, assignor to Tokyo Shibaura Denki Kabushiki Kaisha, Kawasaki-shi, Japan, a joint-stock company of Japan
Filed Aug. 21, 1961, Ser. No. 132,815
Claims priority, application Japan, Aug. 27, 1960, 35/36,033
2 Claims. (Cl. 307—87)

The present invention relates to a synchronizing or paralleling of the systems device between alternating current systems, more particularly to an improved synchronizing device for effecting synchronizing by utilizing a switch having a high closing speed and to an improved device for matching speeds of alternating current machines into synchronism.

In order to connect two alternating current systems in synchronism or parallel it is necessary to make equal the voltage values and to coincide the phases of voltages of the two systems prior to closing of a switch interconnecting the two systems. As pointed out above the switch must be closed at an instant at which the phases of the voltages of the two systems coincide, but actually the switch requires some time interval which varies depending upon the type thereof between the instant at which a closing signal is given applied to the switch and the instant at which the switch actually closes. Accordingly, it is necessary to apply the closing signal to the switch at an instant advancing the point of voltage phase coincidence by this time interval or log. This time interval necessary for closing oil circuit breakers which have been widely used for effecting synchronization is of the order of 25 cycles or more of commercial alternating currents, that is, of 0.5 second or more.

By this reason, prior synchronizing devices have been constructed so as to satisfy relatively long necessary closing time logs. For example, in one prior arrangement a first relay including an operating element for producing an electromagnetic force corresponding to the sum of voltages of two alternating current systems to be synchronized and a restraining element for producing an electromagnetic force corresponding to the difference between said voltages, and a second relay which operates when the phase angle between the voltages of two systems assumes a definite value are provided with their contacts connected in series to energize a closing control circuit of the switch. The first relay is constructed such that it will produce a maximum operating force and zero restraining force when the phases of the voltages of both systems are in phase, but product zero operating force and maximum restraining force at 180° phase difference and generally produce a restraining force which is larger than the operating force at a phase difference angle larger than 90° but produce an operating force which is larger than the restraining force at a phase difference angle smaller than 90°. The second relay is frequently called as a definite phase angle responsive relay and operates in response to the difference between the voltages of two systems to momentarily close its contacts when the phase angle difference has gradually decreased below 90°, for instance. If at this time the constants of the first relay are in their closed position a circuit is formed to send out a closing signal to the switch. However, such a device has a defect in that the instant at which both relays close their contacts varies when the magnitudes of the voltages of both systems are different. If this error is substantial, both systems will be connected at an instant where the phases of both systems are not in coincidence, which is of course objectionable.

In another prior device a direct current voltage corresponding to the vector sum and difference of the voltage of two systems is produced together with a voltage corresponding to the phase difference angle $\theta$ produced from the difference between the vector sum and difference, thereby to impress upon the switch a closing signal at the instant when the difference between the voltage corresponding to the phase difference angle and the voltage corresponding to the rate of change $d\theta/dt$ thereof becomes zero.

However, both of these prior known devices produce the closing signal at an instant about 0.5 second prior to the instant at which the voltages of two systems are in phase so that they are suitable to use for aforementioned oil circuit breakers, but are not suitable for controlling high speed air circuit breakers, for instance, air blast circuit breakers recently developed. Owing to revolutionary developments in design and manufacturing techniques, such air circuit breakers are assembled with moving parts of extremely small mass so that the time necessary to close them has been improved to 10 to 15 cycles or about ⅕ second. This closing time corresponds to about one half of that of the conventional oil circuit breakers, in other words, modern air circuit breakers close at a speed about twice as fast as that of the conventional oil circuit breakers. Therefore, if prior synchronizing devices outlined hereinabove were used for such high speed air circuit breakers, the breakers would be closed prior to the synchronism of the two systems resulting in unsuccessful synchronizing. In addition, where the voltages of two systems are different, synchronization is more difficult because closing control initiating time varies when the conventional synchronizing device is utilized.

Accordingly, it is an object of this invention to provide a novel synchronizing device which can accurately detect the range during which the phase difference between voltages of two systems to be parallel or interconnected at synchronism becomes zero to impress a closing signal to high speed air circuit breakers thereby to close them at an instant at which the two systems are substantially in phase.

Another object of this invention is to provide an improved synchronizing device which is free from variation at the instant at which the closing signals for the circuit breakers are produced even when there are differences in the magnitudes of the voltages of two systems.

Another of the invention is to provide an improved synchronizing device wherein the same relay devices can be also utilized to match the speed of alternators for connecting them at synchronism to an electric system.

Briefly stated, the synchronizing device embodying this invention comprises a circuit breaker adapted to interconnect two alternating current systems, means to derive voltages the phases of which are perpendicular to each other out of said two systems when their phases coincide, means to derive resultant voltages, respectively corresponding to the vector sum and vector difference of the voltages to provide a direct current corresponding to difference of said resultant voltages, a circuit means including a differentiating circuit and an integrating circuit connected in parallel to be supplied with said difference, and means which are provided for each of the differentiating and integrating circuits of said circuit means and cooperate each other to control the closing operation of said circuit breaker in response to currents flowing through the differentiating and integrating circuits.

This invention can be more fully understood from the following detailed explanation taken in connection with the accompanying drawings, in which.

Figure 1:
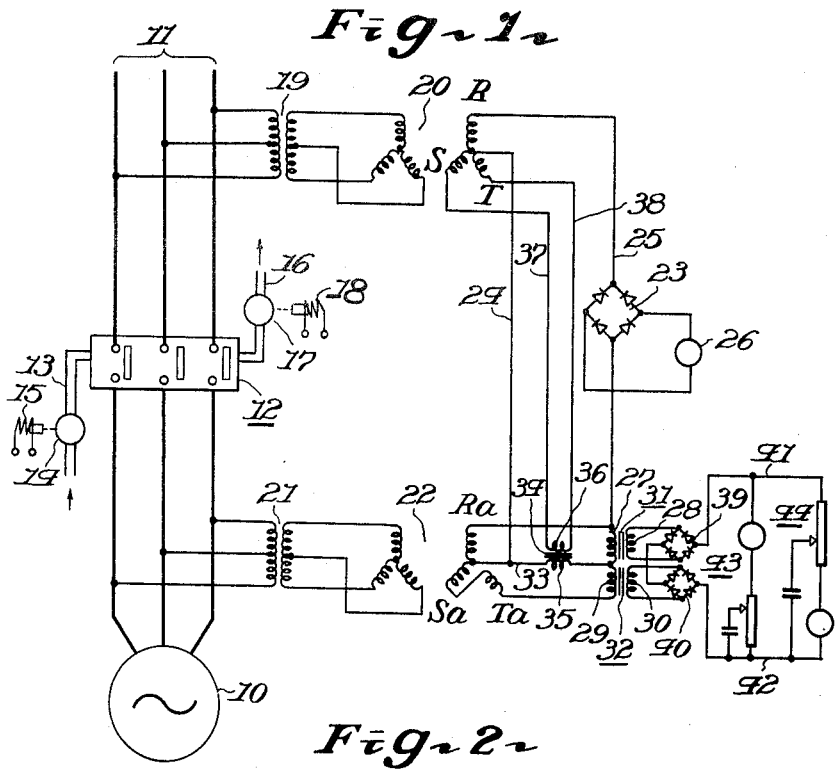
FIG. 1 is a connection diagram illustrating one example of the synchronizing device embodying this invention and adapted to interconnect two alternating current systems.

Referring now to the accompanying drawings which illustrate preferred embodiments of this invention, FIG. 1 illustrates one arrangement for connecting in synchronism an alternating current machine 10 such as an alternator with an alternating current system 11 comprising an electric transmission line. While in the embodiment shown it is easy to make equal the magnitudes of generator voltage and the system voltage, this invention can also be applied for connecting together at synchronism two systems in electric stations such as switching stations where it is generally difficult to make voltages on both sides equal.

For connecting the alternator 10 with the system 11, a high speed air circuit breaker 12 known in the art as a compressed air circuit breaker is provided between them. Any suitable circuit breaker of this type can be used for this purpose but it is preferable to utilize an air circuit breaker of the type wherein its contacts are separated upon introducing of a compressed air into a contact chamber and at the same time a high speed air blast for extinguishing the electric arc is supplied across the separating contacts to interrupt the systems on both sides of the interrupter and wherein contacts are moved to a closed position upon discharging of the compressed air in the contact chamber to interconnect both systems. In order to introduce compressed air into the contact chamber (not shown) of the circuit interrupter from a suitable reservoir (not shown) to open the contacts there is provided a pipe line 13 with an electromagnetic valve 14. The operating coil 15 of this valve 14 is arranged to be energized from a suitable protective device (not shown) when a fault occurs in the generator 10 and or the system 11. In order to close the circuit breaker 12 to connect the generator at synchronism, the contact chamber is provided with a pipe line 16 for venting it to the atmosphere, the pipe line 16 having an electromagnetic valve 17 for effecting closing of the circuit breaker. The electromagnetic valve 17 has a coil 18 arranged to be energized by a control device to be described later when it is intended to close the circuit breaker 12.

An insulating transformer 19 is connected to the system 11 to energize an instrument transformer 20 having star connected primary and secondary windings from the secondary side of an insulating transformer 19. The terminals of the secondary winding of the instrument transformer 20 are designated by R, S and T. Similarly, an insulating transformer 21 is connected across terminals of the alternator 10 and its secondary winding energizes an instrument transformer 22 having a star connected primary winding and a secondary winding with two phases connected in star and a third phase connect in series with one of said two phases, as shown in the drawing. The secondary terminals of the instrument transformer 22 corresponding to those of the instrument transformer 20 are designated by Ra, Sa and Ta. The neutral points of these transformers are interconnected by a conductor 24 and terminals R and Ra are interconnected through a conductor and a full wave rectifier 23. The circuit consisting of these conductors 24 and 25 forms a circuit for deriving a difference voltage corresponding to the phase difference between voltages of phases R and Ra of both systems on the opposite sides of the circuit breaker. Across the direct current output terminals of the rectifier 23, a relay 26 is connected which is so constructed that it will operate when the phase difference between voltages of the phases R and Ra exceed 90° and reset when said phase difference is decreased below 90°. Primary windings 27 and 29 of identical transformers 31 and 32 are connected in series across the terminals Ra and Ta of the transformer 22, and the intermediate point between the primary windings 27 and 29 is connected with the neutral point of the transformer 22 through a conductor 33 and the secondary winding 35 of a transformer 34, the primary winding 36 thereof being connected across the secondary terminals S and T of the transformer 20 via conductors 37 and 38. With such connection it is possible to obtain or derive voltages the phases of which are perpendicular to each other when the phases of the systems on both sides of the circuit breaker 12 coincides. More particularly, a voltage corresponding to the vector sum of the voltage of the phase Ra on the alternator side and a voltage between the phases S and T on the system side, which is perpendicular to the voltage of the phase Ra, is impressed upon the transformer 31 while a voltage corresponding to the vector difference between a voltage which is the resultant of the voltages of the phases Sa and Ta on the generator side, that is, a voltage which is 180° out of phase with respect to the voltage of the phase Ra and the voltage between the phases S and T on the system side is impressed upon the transformer 32. The alternating current input terminals of the full wave rectifiers 39 and 40 are respectively connected across the secondary windings 28 and 30 of the transformers 31 and 32, respectively, to rectify the vectorially combined voltages. The negative terminals of these rectifiers are directly interconnected while the positive terminals are connected with conductors 41 and 42, respectively. When the phases of the voltages on both sides of the circuit breaker coincide, the voltages induced across the secondary terminals of the transformers 31 and 32 will become equal with the result that the output voltage across the output conductors 41 and 42 of the full wave rectifiers 39 and 40 which are connected in series opposition will be zero. When the phase of one side lags or advances from the point of coincidence with respect to the phase of the other side of the circuit breaker 12, the magnitudes of the resultant voltages having a perpendicular phase relation and impressed upon each of the transformers 31 and 32 will become different, thereby to produce a differential voltage across conductors 41 and 42. The magnitude of this differential voltage is in proportion to the amount of phase shift and its polarity is positive or negative dependent upon whether one voltage phase is advancing or lagging with respect to the other. As already pointed out the differential voltage will be zero when the system voltage phase coincides with the generator voltage phase, but when these phases are different the voltage will assume, for instance, a positive polarity having a magnitude corresponding to phase angle variation, will become zero at 180° phase difference, assume a negative polarity beyond 180° and again become zero at 360°.

In the circuit shown in FIG. 1, a voltage between phases of one system and a phase voltage of the other system perpendicular to the first mentioned voltage are utilized to derive a voltage which assumes the perpendicular phase upon coincidence of the voltage phases of both systems. It will be understood, however, that the same object can be attained by utilizing single phases voltages of the same phase of both systems.

Figure 2:
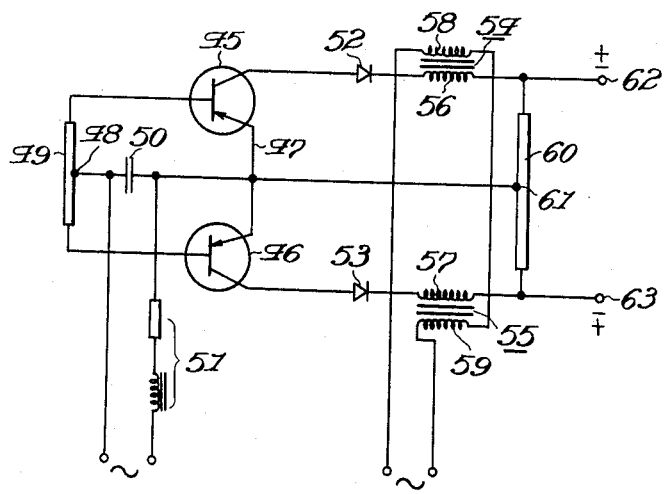
FIG. 2 is a connection diagram showing a modified device for obtaining a signal voltage corresponding to the phase difference angle between the two alternating current systems to be synchronized, said device being constituted by portions different from those shown in FIG. 1.

FIG. 2 illustrates one example of such an arrangement employing a pair of transistors 45 and 46. The emitters of these transistors are interconnected by a conductor 47 and the bases are interconnected through a resistor 49 having an intermediate tap 48. A condenser 50 is connected between the conductor 47 and the tap 48 and the voltage of one phase of the alternator 10 of FIG. 1 is impressed across the condenser through a suitable impedance 51. Thus, the voltage across the condenser will advance by 90° with respect to the phase voltage of the alternator and this condenser voltage is applied across emitters and bases of a pair of transistors 45 and 46. Included in the collector circuits of the transistors are half wave rectifiers 52 and 53 connected to pass forward current but block reverse current of the individual transistor to which they are connected. In addition secondary windings 56 and 57 of transformers 54 and 55 are respectively connected in series with the collector circuits. The primary windings 58 and 59 of said transformers 54 and 55 are connected in series opposition across one phase of the system 11 of FIG. 1, which is the same phase as that of the alternator 10 connected with the condenser 50. A resistor 60 having an intermediate tap 61 connected with the emitters of the pair of transistors 45 and 46 is connected across collector circuits. When the transistor 45 becomes conductive, a current flows during such positive half cycle of the alternating current through a circuit including the transistor 45, half wave rectifier 52, secondary winding 56 of the transformer 54, and a conductor interconnecting the tap 61 and the emitter so as to produce an output voltage which is positive at the upper terminal and negative at the intermediate tap 61 of the resistor 60. On the other hand, when the transistor 46 becomes conductive, a current flows during each negative half cycle of the system voltage through a circuit including the transistor 46, half wave rectifier 53, the secondary winding 57 of the transformer 55, lower half of the resistor 60 and a conductor interconnecting the intermediate tap 61 and the emitter of the transistor so as to produce an output voltage making negative the tap 61 and positive the lower terminal of the resistor 60. When the phases of the voltages on both sides of the circuit breaker 12 of FIG. 1 become equal, the phase relation between the voltage across the base and emitter and the voltage impressed upon the collector circuit of the pair of transistors 45 and 46 will be perpendicular due to the action of the condenser 50 and the base potentials of the pair of transistors will be maintained negative during the same interval of each of the positive and negative half cycles of the voltage impressed upon the collector circuit so that each transistor conducts current during this interval. Accordingly, the magnitudes of output voltages appearing across the upper and lower halves of the resistor 60 are equal so that the resultant output voltage is zero. When the relation between voltage phases of two alternating current systems is shifted from the aforementioned perpendicular relation, one of the transistors will conduct during an interval longer than that of the other transistor, or vice versa, depending upon the direction of phase shift resulting in the difference between output voltages across the upper and lower halves of the resistor 60. Thus, it is possible to obtain a resultant differential voltage output from a pair of output terminals 62 and 63 which varies its magnitude and reverses its polarity depending upon the phase angle. This function is the same as that of the embodiment shown in FIG. 1.

As mentioned above, since the time for closing high speed air circuit breakers is very short of the order of about ⅕ second, it is essential to apply a closing order signal to the circuit breaker 12 near a point at which phase difference between system voltages on both sides of the circuit breaker becomes substantially zero. Therefore, it is necessary to construct the device which generates this signal such that it will operate with high sensibility near an instant at which system voltages becomes to have the same phase, in other words, near the zero point of the differential voltage responsive to the phase difference angle produced across conductors 41 and 42. For attaining this object a differentiating relaying circuit generally designated by a reference numeral 43 and an integrating relaying circuit generally designated by 44 are connected in parallel across conductors 41 and 42 (FIG. 1).

Figure 3:
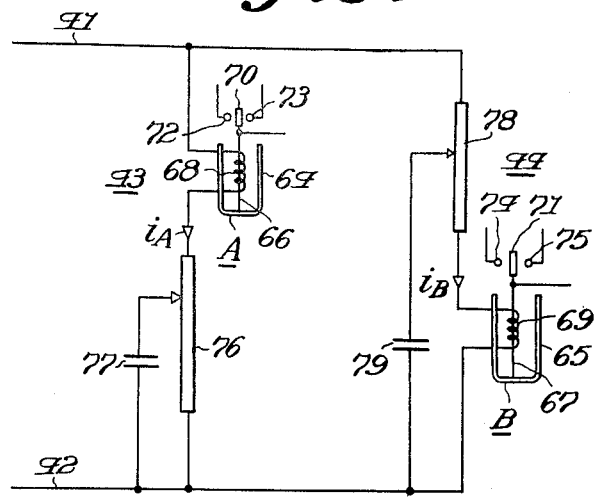
FIG. 3 is a connection diagram of one example of a synchronism detecting relay device suitable for use in the device shown in FIG. 1.
Figure 4:
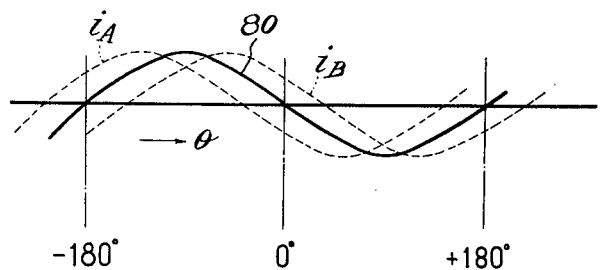
FIG. 4 illustrates a set of curves to aid in explanation of the phase relation between the energizing current for the relay device shown in FIG. 3 and the signal voltage corresponding to the phase difference angle.

As is best shown in FIG. 3 the relaying circuit means 43 and 44 comprise polarized relays A and B, respectively, including U shaped permanent magnets 64 and 65, moving armatures 66 and 67 disposed between poles of said magnets, coils 68 and 69 wound around said armatures, movable contacts 70 and 71 mounted upon the armatures and pairs of fixed contacts 72, 73 and 74, 75 disposed on the opposite sides of the armatures. As is well known in the art these polarized relays A and B operate to tilt their moving contacts 70 and 71 toward the left fixed contacts 72 and 74 or toward the right fixed contacts 73 and 75 depending upon the magnitude and polarity of the current flowing through their coils 68 and 69. Thus by properly selecting spacings between contacts of the relays A and B it is possible to cause the movable contact to engage the fixed contact on either side when the current flowing through coils 68 and 69 exceeds a predetermined value. Stated another way it is possible to make inoperative these relays at any phase difference angle below a predetermined value. A differentiating circuit element comprising a resistor 76 and a condenser 77 connected across a portion of the resistor 76 is connected in series with the coil 68 of the relay A across conductors 41 and 42. Thus the relay A can effect proportional as well as differentiating operations. The coil 69 of the other relay B is connected in series with a resistor 78 across conductors 41 and 42 and a condenser 79 is connected in parallel with a portion of the resistor 78 and the coil 69. In this way also the relay B can effect proportional as well as differentiating operations. With such an arrangement when a voltage corresponding to a phase difference angle is impressed across conductors 41 and 42, a leading current will flow through the coil 68 of the relay A while a lagging current will flow through the coil 69 of the relay B. The operating characteristics of these circuits can be regulated by varying the position of the sliding arms of the resistors 76 and 78. For example, in circuit 43, as the sliding arm of the resistor 76 is moved upwardly the phase of the energizing current of the relay A advances and the angle of advance decreases as the sliding arm is moved downwardly. Also in the circuit 44, as the sliding arm of the resistor 44 is moved downwardly those of the energizing current of the relay B lags and decreases as the arm is moved upwardly. In FIG. 4 the solid line represents the voltage 80 corresponding to the phase difference angle impressed across conductors 41 and 42 of FIG. 3 while the dotted lines represent the energizing currents $i_A$ and $i_B$ for relays A and B, respectively, to illustrate phase relationship therebetween. The abscissa represents the phase difference, or phase difference angle $\theta$, between two alternating current systems to be synchronized which shows that the voltage 80 appearing across conductors 41 and 42 is zero at $\theta = -180°$, 0° or $+180°$ as already mentioned, that the voltage has values corresponding to the phase difference angle at other points and that the polarity of the voltage changes at $-180°$, 0° and $+180°$. The degree of advance of current $i_A$ and the degree of lag of current $i_B$ vary in proportion to the frequency of the voltage 80, or slip frequency. While in the energizing currents $i_A$ and $i_B$ of relays A and B are shown to lead or log by the same angle with respect to the voltage 80 of slip frequency, these angles of advance or lag can be adjusted independently by varying the position of the sliding arms of the resistors 76 and 78 of FIG. 3. Thus, it is possible to adjust the phase of the current $i_A$ to slightly lend with respect to the voltage 80 of the slip frequency whereby it is possible to cause the current $i_A$ to pass through the zero point at a predetermined instant which is earlier by about ⅓ second than the instant at which voltages of the two systems have the same phase and thus the voltage of the slip frequency becomes zero. By maintaining narrow the spacing between contacts of the relay A, it is possible to separate its movable contact from a fixed contact and move it to the neutral point. Since as the phase of the energizing current of the relay A advances as the slip frequency increases, the instant at which the movable contact assumes the neutral position will also be increased. Similarly the relay B operates in such a manner that its movable contact will assume the neutral position at an instant lagging from the instant of the same phase.

Figure 5:
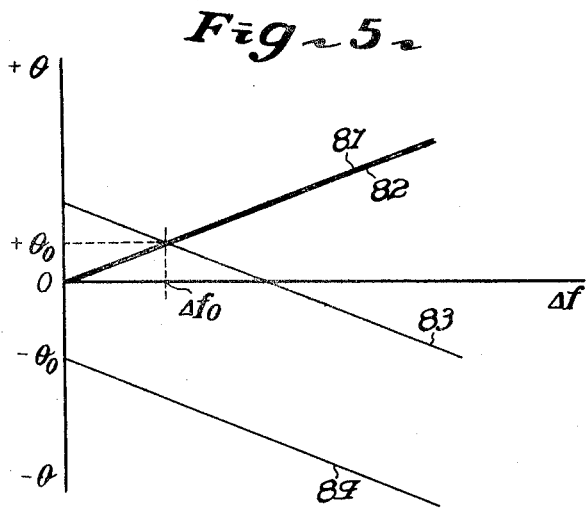
FIG. 5 is a set of characteristic curves to aid an explanation of the operation of the relay device of FIG. 3.

FIG. 5 is a graph showing the operating characteristics of the relay wherein the abscissa represents the slip frequency $\Delta f$ and the ordinate the phase angle. As stated above, by maintaining very narrow the spacing between fixed contacts of the relay A it is possible to bring the movable contact to the neutral position at a current value below a small predetermined value before and after the zero point of the energizing current. Since the instant at which the movable contact assumes the neutral position advances as the slip frequency $\Delta f$ is increased the relay A tends to open its contacts at larger phase difference angles. Therefore, the range in which the movable contact of the relay A assumes a neutral position can be represented by an area between two straight lines 81 and 82 when the phase difference angle gradually decreases with respect to any value of the difference frequency $\Delta f$. For example, at a certain value of $\Delta f$, when the phase difference angle decreases toward zero and reaches a corresponding value of $\theta$ the movable contact will separate from one of the fixed contacts and move a neutral point in response to the said value of $\theta$ represented by the ordinate on the straight line 81 and when $\theta$ decreases further the movable contact will engage the other fixed contact in response to the value of $\theta$ represented by the ordinate on the straight line 82. The contact closing and opening operation of the relay B of FIG. 3 is quite identical to that of the relay A except that it responds to the lagging current $i_B$ as mentioned above. The spacing between contacts of the relay B is set considerably wider than that of the relay A so that the movable contact may be separated from the right or left fixed contact toward the neutral point even when the phase difference angle is of substantial positive or negative value. The operating characteristics of the relay B can be shown by two straight lines because this relay is operated by the lagging current. Thus, the movable contacts of both relays A and B simultaneously assume the neutral position at any slip frequency below a slip frequency $\Delta fo$ shown by the crossing point of the characteristic curves of both relays. Accordingly the constants of various elements are so adjusted that the movable contacts of both relays A and B will simultaneously assume the neutral point at an instant about ⅓ second prior to synchronism.

Figure 6:
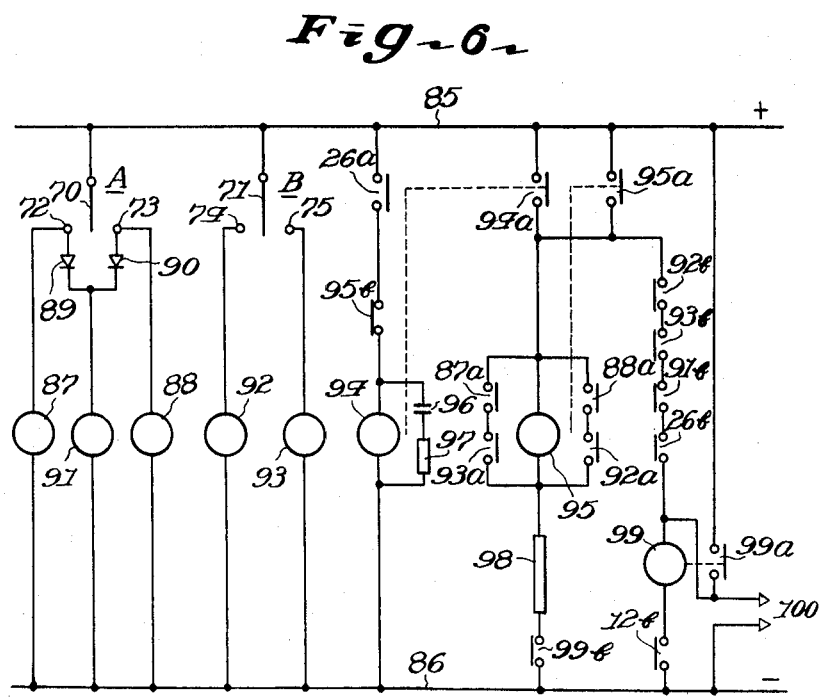
FIG. 6 is a control circuit adapted to interconnect at synchronism the two alternating current systems of FIG. 1.

FIG. 6 illustrates a control circuit for supplying a closing signal to the circuit breaker 12 of FIG. 1 by utilizing the relays A and B. Here the movable contact 70 of the relay A is connected with a plus conductor 85, one of the fixed contacts 72 with a minus conductor 86 via an auxiliary relay 87 while the other fixed contact 73 also with the minus conductor via an auxiliary relay 88. The negative terminals of half wave rectifiers 89 and 90 are connected with fixed contacts 72 and 73, respectively, and the positive terminals are connected in common with the negative conductor 80 via an auxiliary relay 91. Thus, when the movable contact 70 engages the fixed contact 72 auxiliary relays 87 and 91 will be connected across conductors 85 and 86, whereas when the movable contact 70 engages the other fixed contact 73 auxiliary relays 88 and 91 are connected across conductors 85 and 86. In a similar manner the movable contact of the relay B is connected with the plus conductor 85 while its fixed contacts 74 and 75 are connected with the minus conductor 86 respectively through auxiliary relays 92 and 93. Thus when movable contact 71 engages fixed contact 74 or 75, relays 92 or 93 will be energized from conductors 85 and 86 whereas when the movable contact assumes the neutral position none of the auxiliary relays is energized. A time delay relay 94 which operates with a time delay when energized and resets instantly when deenergized is connected across conductors 85 and 86 in series with a contact 26a which is closed when the relay 26 of FIG. 1 operates and a contact 95b arranged to be closed when a relay 95 operates as will be described later. In order to operate the relay 94 with a time delay, a time delay circuit including a serially connected condenser 96 and a series resistor 97 are connected in parallel with the relay 94. Contacts 87a and 93a which are respectively closed when the auxiliary relays 87 and 93 operate are connected in parallel with a relay 95, and contacts 88a and 92a which are respectively closed when the auxiliary relays 88 and 92 operate are also connected in parallel with the relay 95. These parallel connected circuits are connected in series with a contact 94a which is closed when the time delay relay 94 operates, a current limiting resistor 98, and a contact 99b which is opened when a control relay 99 to be described later operates, across conductors 85 and 86. A contact 95a which is closed when the relay 95 operates is connected in parallel with the contact 94a of the time delay relay 94 to constitute a self holding circuit for this time delay relay. Contacts 91b, 92b, 93b and 26b which are respectively opened when auxiliary relays 91, 92 and 93 and the relay 26 of FIG. 1 operate, and a normal close auxiliarly contact 12b of the circuit breaker 12 of FIG. 1 are connected in series with a control relay 99 and one end of this series combination is connected to a common junction between contacts 94a, 95a and relay 95 while the other end is connected to the minus conductor 86. One terminal of a contact 99a arranged to be closed when the relay 99 operates is connected with the plus conductor and its other terminal is connected with a point between the relay 99 and the contact 26b. Thus, the closing signal is obtained from output conductors 100 connected between the other terminal of the contact 99a and the minus conductor 86.

The circuit shown in FIG. 6 operates as follows. When a frequency difference between two systems to be synchronized is large, the relay 94 does not operate because it is a time delay type, so that its contact 94a will not be closed and hence the closing signal generating circuit will not be closed.

As the frequencies of the two systems approach each other and when the relay 26 of FIG. 1 operates at a phase difference of a phase difference angle of over 90° to close its contact 26a, then the time delay relay 94 will operate to close its contact 94a. Closing of the contact 94a results in the energization of the relay 95 to close its self holding contact 95a. During the interval wherein the phase difference angle aproaches zero from a value of over 90°, if the frequency difference $\Delta f$ were larger than $\Delta fo$ shown in FIG. 5, the movable contacts of relays A and B would operate in a different way, viz. for example, when the movable contact 71 of the relay B engages fixed contact 74 the movable contact 70 of the relay A engages fixed contact 73. At this time auxiliary relays 91, 88 and 92 will be energized from conductors 85 and 86 to close contacts 88a and 92a and open contacts 91b and 92b. Closure of contacts 88a and 92a results in short-circuiting of the relay 95 to reset it and causes its contact 95a to open. Thus the output circuit of the closing signal is not formed.

When frequencies of the two systems further each other and the phase difference angle decreases to $\Delta fo$ and $+\theta_0$, both relays A and B will become inoperative and open their contacts simultaneously. Hence all of the auxiliary relays 87, 91, 88, 92 and 93 will become inoperative. As already mentioned, the relay 26 of FIG. 1 has once operated at a phase difference angle over 90° to operate the relay 95 and has maintained it in its operated state by contact 95a and the relay 26 has reset to open its contact 26a and close its contact 26b when the phase difference angle is decreased below 90°. When relays 87, 88, 91, 92 and 93 become inoperative simultaneously as mentioned above in such condition, contacts 87a, 88a, 92a and 93a are opened thereby not to permit the relay 95 to reset and contacts 92b, 93b, 91b and 26b close simultaneously to send out a closing signal from terminals 100 and at the same time the relay 99 operates to close its contact 99a to complete its self holding circuit. When closed, the circuit breaker 12 of FIG. 1 opens its normal closed auxiliary contact 12b to open the self holding circuit. As has been fully explained with reference to FIG. 5, the closing signal is generated by the simultaneous departure of movable contacts of relays A and B from their fixed contacts at a point of frequency difference $\Delta fo$ and phase difference angle $+\theta_0$ a little ahead of the synchronism at which both phase difference $\theta$ and frequency difference $\Delta f$ are zero. By proper selection of circuit constants of the relaying circuit shown in FIG. 3, it is possible to accurately set the instant of generation of this closing signal to the particular instant which is prior by ⅕ second, for instance, to the instant at which voltage phases of the two systems coincide perfectly. This makes possible for a high speed air circuit breaker having very short closing time of the order of about ⅕ second to positively close at the instant at which voltage phases of the two systems nearly coincide.

Furthermore, since according to the synchronizing circuit embodying this invention, voltages the phases of which are perpendicular to each other are obtained when the voltage phases of two systems coincide and voltages corresponding to the vector sum and difference of these voltages are rectified to produce the difference thereof to energize the circuits 41 and 42 of the relays A and B, as shown in FIGS. 1 and 2, there is no fear of producing errors in the operating instants of the relays A and B even when there is a voltage difference between two systems to be synchronized thereby making it possible to always close the circuit breaker 12 at the instant at which the phases of the two systems coincide.

Moreover, since in the synchronizing device of this invention, the circuits are so arranged to pass, through the relays A and B, currents having leading and lagging phases with respect to the voltage corresponding to a frequency difference to cause said relays A and B to effect their contact change over in accordance with the value of the current, it is possible to detect the point at which phases exactly coincide by detecting the instant at which movable contacts simultaneously depart from their associated fixed contacts toward the neutral position.

As can be clearly understood from FIG. 4, the relays A and B, the operation thereof has already been explained with reference to FIGS. 3, 5 and 6, simultaneously become inoperative at a point near the phase difference angle of 0° at which the voltage phases of two systems become the same, but they also become inoperative at the phase difference angle of 180°. Therefore, it is necessary to prevent sending-out of a closing signal for the circuit breaker 12 at a point near the phase difference angle of 180°. In FIG. 6, the contact 26b which is in series with the self holding relay 99 is provided for this purpose. This contact 26b is a normally closed contact of the relay 26 of FIG. 1 and arranged to be closed when the phase difference angle between the two systems is below 90° and opened above 90°. Therefore, this contact is maintained in an opened state to prevent sending-out of a closing signal to the switch 12 when the phase difference angle is 180°.

Figure 7:
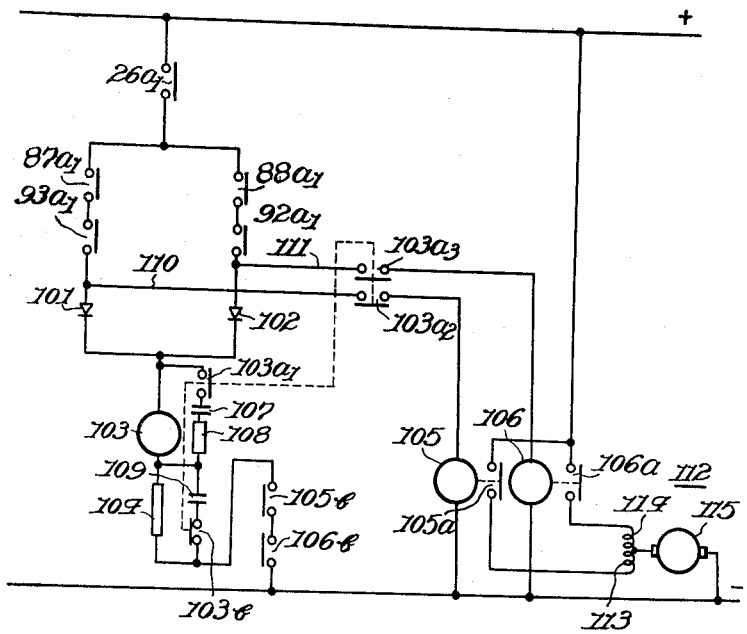
FIGS. 7 and 8 illustrate circuit diagrams of control circuits utilizing the relay device shown in FIG. 3 for matching to synchronism the speed of an alternator which is to be connected to the system.

The synchronizing device constructed in accordance with this invention can also be used as a synchronous speed matching device. As already explained with reference to FIGS. 3 to 6 inclusive, while both the relays A and B also become inoperative simultaneously at a point near 180° of phase difference angle between the two systems, this is not necessary for connection at synchronism. However, by effecting speed matching at the time when the phase difference angle between the two systems is so large as 180°, there is an advantage of preventing over regulation when compared with the case in which speed matching is effected at a point of the same phase. In FIG. 7, $26a_1$ indicates a normal open contact of the relay 26 of FIG. 1 which is arranged to be closed at a phase difference angle over 90° between the two systems and closed below 90°. Contacts $87a_1$, $88a_1$, $92a_1$ and $93a_1$ are normally closed contacts respectively of the relays 87, 88, 92 and 93 of FIG. 6 and are arranged to be opened and closed in response to the operation of the relays A and B. Contacts $87a_1$ and $93a_1$ are connected in series with a half wave rectifier 101. Also contacts $88a_1$ and $92a_2$ are connected in series with a half wave rectifier 102. These series circuits are connected in parallel and then connected in series across a source of supply indicated by $+$ and $-$ to said contact $26a_1$, a relay 103 which operates instantly but resets with a time delay, a resistor 104 and normal close contacts $105b$ and $106b$ respectively of relays 105 and 106 to be described later. Since the relay 103 is of a type operating instantly and resets with a time delay, a time constant circuit is connected in parallel therewith comprising the contact $103a_1$ of the relay 103, a condenser 107 and a resistor 108. In order to impart the instantaneous operating characteristic to the relay 103, a circuit comprising a normally open contact $103b$ thereof and a condenser 109 in series therewith is connected across the resistor 104. This circuit assures quick operation of the relay 104 by momentarily short-circuiting the series resistor 104 to increase the energizing current at the time when the relay 103 is energized. After operation of the relay 103 the short-circuiting circuit around the resistor 104 is opened to decrease the energizing current.

A conductor 110 is connected to a point between the contact $93a_1$ and the rectifier 101 and a conductor 111 is connected to a point between the contact $92a_1$ and the rectifier 102. In each of these conductors each of normal open contacts $103a_2$ and $103a_3$ of the relay 103 which operates instantly and resets with a time delay is included and each of these conductors is connected with the minus side of the source respectively through the relays 105 and 106. One side terminals of normally open contacts of these relays are connected with the plus side of the source and the other terminals are connected with the minus side respective through a forward and reverse field windings 113 and 114 and an armature 115 of an electric motor 112. Although not shown in the drawing the motor 112 serves to regulate a governor of a prime mover driving the alternator 10 of FIG. 1 so as to adjust power input to the prime mover.

When the phase difference angle between two systems is near the points of 180°±90°, the contact $26a_1$ is closed to form a speed matching control circuit. The relays A and B actuate their movable contacts to tilt against either left or right fixed contacts so that contacts $87a_1$ and $93a_1$ are closed when the phase of the alternator is lagging with respect to the voltage phase of the system which is now considered as the reference, and to close contacts $88a_1$ and $92a_1$ when leading. While the contacts $87a_1$ and $93a_1$ or $88a_1$ and $91a_1$ are closed simultaneously the governor motor 112 will operate in a forward or reverse direction during an interval determined by the relay 103 to increase or decrease the power input to the prime mover thus effecting speed matching of the alternator 10 by increasing or decreasing the speed thereof.

When the device shown in FIG. 7 is utilized in combination with device shown in FIG. 6, a combined speed matching and synchronizing device can be formed wherein speed matching to synchronism is effected when the phase difference angle between the two systems is near 180°, speed matching operation is stopped by opening the contact $26a_1$ when the phase difference angle is decreased below 90° and the connection at synchronism is automatically effected near 0°. Moreover the synchronizing device shown in FIG. 7 is advantageous in that it can be formed by adding few parts to the device shown in FIG. 6.

Figure 8:
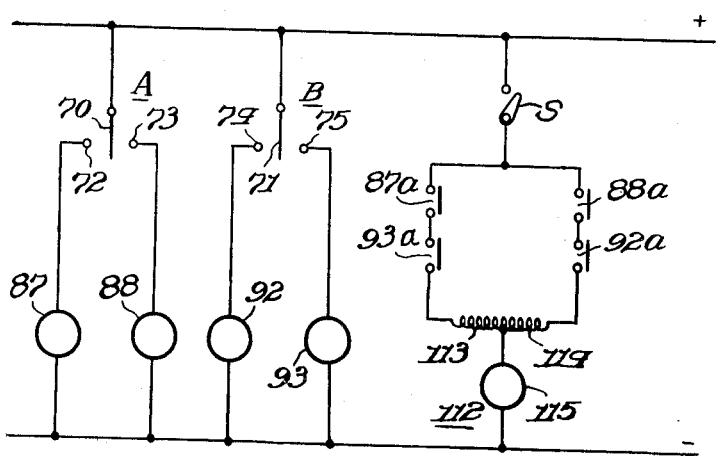

FIG. 8 illustrates a modification wherein the relays A and B of FIG. 3 are utilized in a device to be exclusively used for speed matching, and parts corresponding to those of FIGS. 6 and 7 are given the same reference numerals. Prior automatic speed matching devices were constructed so as to control the governor motor for the prime mover in response to the magnitude and direction of a slip frequency to match generator frequency with system frequency. Hence it will operate until both frequencies completely coincide, so that there was a tendency of over regulation or hunting. Moreover, considerable time was necessary until frequencies are perfectly matched in case when the slip is large.

In the circuit 112 shown in FIG. 8, however, the circuit for effecting proportional and differentiating operations will cause the movable contact 70 of a polarized relay A to engage the stationary contact 72 when the angular velocity of a generator is smaller than that of a reference system. On the other hand the circuit for effecting proportional and integrating operations will cause the movable contact 71 of another polarized relay B to engage the stationary contact 75, whereby auxiliary relays 87 and 93 are energized to close their contacts 87a and 93a, respectively. Accordingly, when a manually operated switch S is closed, a phase adjusting motor 115 will be rotated in the forward direction, for example, to increase input to the prime mover and hence increase the speed of the generator. Conversely, when the angular velocity is larger than that of the system the contacts 70, 71 of the relays A, B engage fixed contacts 72, 74 and the auxiliary relays 88, 92 are energized and contacts 88a and 92a will be closed to reverse the rotation of the motor 115 to decrease the speed of the generator, thus effecting synchronizing. Thus, by the circuit shown in FIG. 8 which utilizes a difference between differential and integral, that is the difference between lead and lag in the relay energizing circuit in addition to a proportional function due to frequency difference. The difference also becomes large when the frequency difference is large so that control is effected proportionately, thus the accelerating speed matching operation. Moreover, as the frequency difference decreases, the control becomes inoperative so that there is no fear of over regulation or hunting. As the frequency difference decreases, the device becomes inoperative so that there is no fear of over regulation.

While this invention has been shown and described with respect to preferred embodiments thereof it will be obvious to those skilled in the art that various changes and modifications may be made without departing from the true spirit and scope of this invention as defined in the appended claims.

What I claim:

1. A synchronizing device for use to parallel two different alternating current systems connected to different sources, comprising, a circuit breaker adapted to interconnect said two alternating current circuits, means connected in operation to said two alternating current systems to derive from said two systems derived voltages the phases of which are perpendicular to each other when the phases of said systems coincide, means connected to receive said derived voltages to derive resultant voltages respectively corresponding to the vector sum and the vector difference of said derived voltages and including means to rectify said resultant voltages and develop a differential voltage corresponding to the difference between said resultant voltages, circuit means comprising differentiating and integrating circuits connected in parallel to receive said differential voltage, means included in each of said differentiating and integrating circuits cooperating to close said circuit breaker in response to current flow through said differentiating and integrating circuits when said differential voltage has a value greater than zero.

2. A synchronizing device for use to parallel two different alternating current systems connected to different sources comprising, in combination, an alternating current machine in one of said systems, to be paralleled with the other system, a circuit breaker to connect said system with said alternating current machine with the other of said sytsems, means connected in operation to said systems to derive voltages the phases of which are perpendicular to each other when the phases of voltages of said systems coincide, means to receive the derived voltages to derive resultant voltages respectively corresponding to the vector sum and the vector difference of said derived voltages of perpendicular phases and to rectify said resultant voltages to develop a differential voltage representative of the difference between said resultant voltages, circuit means impressed with said differential voltage and including a differentiating circuit and an integrating circuit, a first polarized relay included in said differentiating circuit to operate in dependence upon current flowing therein and a second polarized relay included in said integrating circuit to operate in dependence upon current therein, means including speed matching control means in said circuit, means to render said polarized relays ineffective simultaneously near a point at which said phases coincide to transmit a closing signal to said circuit breaker and to render said relays effective simultaneously at a point near 180° to allow said speed matching control means to effect speed matching of said alternating current machine.

References Cited by the Examiner

UNITED STATES PATENTS

| 2,279,978 | 4/1942 | Gannett | 333—19 |
| 2,564,439 | 7/1951 | Morrison | 307—87 |
| 2,566,832 | 9/1951 | Grundmann | 333—19 |
| 2,675,492 | 8/1954 | Milne | 307—87 |
| 2,777,075 | 1/1957 | Moynihan | 307—87 |
| 2,838,685 | 6/1958 | Stineman | 307—87 |
| 2,900,528 | 8/1959 | Baude | 307—87 |
| 2,908,826 | 10/1959 | Oldenburger | 307—87 |
| 3,069,556 | 12/1962 | Appelbeck et al. | 307—87 |

FOREIGN PATENTS 444,270   3/1936   Great Britain.

LLOYD McCOLLUM, *Primary Examiner.*

SAMUEL BERNSTEIN, *Examiner.*